US011362490B2

(12) United States Patent
Nagaki et al.

(10) Patent No.: US 11,362,490 B2
(45) Date of Patent: Jun. 14, 2022

(54) COATING STRIPPING DEVICE AND COATING STRIPPING METHOD USING THE SAME

(71) Applicant: NAGAKI SEIKI Co., Ltd., Daito (JP)

(72) Inventors: Takayuki Nagaki, Daito (JP); Tamotsu Iwama, Daito (JP)

(73) Assignee: Nagaki Seiki Co., Ltd., Osaka (JP)

( * ) Notice: Subject to any disclaimer, the term of this patent is extended or adjusted under 35 U.S.C. 154(b) by 0 days.

(21) Appl. No.: 16/491,062

(22) PCT Filed: Apr. 15, 2019

(86) PCT No.: PCT/JP2019/016219
§ 371 (c)(1),
(2) Date: Sep. 4, 2019

(87) PCT Pub. No.: WO2019/203202
PCT Pub. Date: Oct. 24, 2019

(65) Prior Publication Data
US 2021/0336427 A1 Oct. 28, 2021

(30) Foreign Application Priority Data

Apr. 19, 2018 (JP) .............................. JP2018-080907

(51) Int. Cl.
*H02G 1/12* (2006.01)
*B26D 3/11* (2006.01)
*B26D 3/16* (2006.01)

(52) U.S. Cl.
CPC ............. *H02G 1/1224* (2013.01); *B26D 3/11* (2013.01); *B26D 3/169* (2013.01); *H02G 1/1226* (2013.01)

(58) Field of Classification Search
CPC ........ H02G 1/1224; H02G 1/226; B26D 3/11; B26D 3/169; B26D 2/169; H01R 43/042; B23D 29/023
(Continued)

(56) References Cited

U.S. PATENT DOCUMENTS 3,433,106 A * 3/1969 Matthews ............ H02G 1/1226
81/9.41
3,826,001 A * 7/1974 Bilbrey ................ H02G 1/1226
30/90.1
(Continued)

FOREIGN PATENT DOCUMENTS

| JP | 2008-136299 A | 6/2008 |
|---|---|---|
| JP | 2011223875 A | 11/2011 |
| JP | 2014230428 A | 12/2014 |

OTHER PUBLICATIONS

Supplementary Eruopean search report for corresponding European application No. 19756314 dated Sep. 15, 2020.
(Continued)

*Primary Examiner* — Evan H MacFarlane
*Assistant Examiner* — Fernando A Ayala
(74) *Attorney, Agent, or Firm* — Kelly & Kelley, LLP

(57) ABSTRACT

A coating stripping device includes a rotation driving tool and a coating stripping tool. A rotating disk of the rotation driving tool includes a first rotating disk having a projection, and a second retaining member of the coating stripping tool has a feather-shaped part. The coating stripping tool in the released state is attached to the second rotating disk and the first rotating disk rotates in a predetermined direction to bring the feather-shaped part into contact with the projection, thereby switching the coating stripping tool into the retained state, and when the coating stripping tool is in the retained state, the first rotating disk rotates in a direction opposite to the predetermined direction to bring the feather- (Continued)

shaped part into contact with the projection, thereby switching the coating stripping tool into the released state.

4 Claims, 8 Drawing Sheets

(58) Field of Classification Search
 USPC .................................................. 30/90.1, 90.4
 See application file for complete search history.

(56) References Cited

U.S. PATENT DOCUMENTS

| | | | | |
|---|---|---|---|---|
| 4,028,800 | A | * | 6/1977 | Matthews ............ H02G 1/1226 30/90.1 |
| 4,104,791 | A | * | 8/1978 | Sunahara ............. H02G 1/1226 30/90.1 |
| 2008/0078087 | A1 | * | 4/2008 | Allard .................. H02G 1/1224 30/90.1 |
| 2011/0083539 | A1 | * | 4/2011 | Ducret ................. H02G 1/1297 83/411.6 |
| 2018/0138673 | A1 | * | 5/2018 | Messina ............... H02G 1/1265 |

OTHER PUBLICATIONS

Communication pursuant to Article 94(3) EPC for European Application No. 19 756 314.1 dated Aug. 2, 2021.

European search report for European Application No. 19 756 314.1 dated Aug. 2, 2021.

Pending claims of European Application No. 19 756 314.1 as of Aug. 10, 2021.

* cited by examiner

US 11,362,490 B2

COATING STRIPPING DEVICE AND COATING STRIPPING METHOD USING THE SAME

FIELD OF THE INVENTION

The present invention relates to a coating stripping device to strip insulation coating of an electric wire used for high voltage wiring etc., and a coating stripping method using the same.

BACKGROUND OF THE INVENTION

In stringing work, such as a construction that connects an end or middle part of an electric wire coated with, for example, an insulating material to another electric wire, it is necessary to strip an insulation coating of a part of the electric wire for connection and to expose a core wire. Such a stripping of the insulation coating of the electric wire is required in a construction intended for connection between electric wires, separation of an electric circuit, connection of a device to an electric wire or the like. In principle, the work is performed under a live wire state for the purpose of preventing blackout. Therefore, it is required to attach a coating stripping device to an insulation control rod and operate it by remote control from the ground. Conventionally, a coating stripping device as shown in FIG. 8 has been used for such work (for example, see Japanese Unexamined Patent Application Publication No. 2008-136299).

In a coating stripping device (100), a coating stripping tool (110) comprises: a pair of retaining members (111) and (112) where an electric wire retaining part (113) is formed by their inner surfaces opposing each other, the pair of retaining members housing an electric wire A from two directions perpendicular to a central axis of the electric wire A, and a stripping blade (118) protruding into the electric wire retaining part (113) with a predetermined angle of advance with respect to the electric wire A housed in the electric wire retaining part (113); a rotation driving tool (120) comprises: a rotating disk (121) with a part of its outer periphery being cut away, where a space for removably accommodating an electric wire (121a) are provided at the central part, and where a port for removably inserting electric wire (121b) is provided at the cut part, a case (127) rotatably retaining the rotating disk (121), a rotation transmitting means (130) retaining the case (127), being attached to a tip of a remote control rod (2), and transmitting rotation of the rotating shaft of the remote control rod (2) to the rotating disk (121), and a coating stripping tool retaining part (140) attaching the coating stripping tool (110) to the rotating disk (121). The rotational force provided by the rotation of the remote control rod (2) is transmitted via the rotation driving tool (120) to the coating stripping tool (110) and rotates the coating stripping tool (110) around the central axis of the wire A, thereby allowing for stripping an insulation coating (not shown) of the electric wire A by a blade width of a stripping blade (118).

The coating stripping tool (110) of such coating stripping device (100) can, when rotating an operation ring (115), move the retaining members (111) and (112) in a direction such that both retaining members (111) and (112) get close to each other in order to narrow the distance therebetween, and, on the contrary, when rotating the operation ring (115) in a different direction, move the retaining members (111) and (112) in a direction such that both retaining members (111) and (112) separate from each other in order to increase the distance therebetween.

SUMMARY OF THE INVENTION

By the way, stripping of the coating of a middle part of the strung electric wire is required in a construction intended for connection between electric wires, separation of an electric circuit, connection of a device to an electric wire or the like. In principle, the work is performed under a live wire state for the purpose of preventing blackout.

Stripping of the coating of an electric wire in a live line state requires an approach to the electrical wire strung in the air. However, if a worker has to work closer to the electric wire in the air, working at high altitude is dangerous and has poor working efficiency. On the other hand, if a worker has to operate the coating stripping tool (100) by remote control on the ground or a working vehicle, there has been a problem, in particular, that an operation to prepare an open/close control rod separately, suspend a tip of the open/close control rod from the operation ring (115), and rotate this to rotate an advancing/retreating shaft in order to advance the retaining members (111) and (112) to the electric wire retaining part required operation of two rods and was complicated and difficult, thereby producing low working efficiency.

Accordingly, the present invention is made in view of the problem as described above and aims to provide a coating stripping device to safely and high-efficiently strip insulation coating of an electric wire etc. strung in the air by remote control on the ground or a working vehicle, and a coating stripping method using the same.

Means for Solving the Problems

In order to achieve the purposes described above, the coating stripping device according to the present invention comprises: a rotation driving tool attached to a tip of a remote control rod gripped by a worker; and a coating stripping tool attached to the rotation driving tool, the rotational force by rotation of the remote control rod being transmitted via the rotation driving tool to the coating stripping tool, and the coating stripping device rotating the coating stripping tool around the central axis of the electric wire to strip insulation coating, wherein the coating stripping tool comprises: a retaining member for retaining the electric wire; and a stripping blade protruding into the insulation coating of the electric wire retained by the retaining member, wherein the rotation driving tool comprises: a case, the case having a port for removably inserting electric wire formed with a part of its outer periphery being cut away and an electric wire housing space for removably housing the electric wire through the port; a rotating disk rotatably retained by the case, the rotating disk having a port for removably inserting electric wire formed with a part of its outer periphery being cut away and an electric wire housing space for removably housing the electric wire through the port; and a rotation transmitting means retained by the case and transmitting rotation of the rotating shaft of the remote control rod to the rotation of the rotating disk, wherein the retaining member has a first retaining member and a second retaining member that can be rotatable to the first retaining member, wherein the coating stripping tool is configured to be switched between a retained state where the electric wire is held by the first retaining member and the second retaining member and a released state where the port for removably inserting electric wire is formed and the electric wire is inserted/removed through the port for removably inserting electric wire, wherein the rotating disk of the rotation driving tool comprises a second rotating disk having a first rod and a second rod parallel to the first rod, wherein the first retaining member of the coating stripping tool has a first hole in which the first rod is inserted, and a second hole in which the second rod is inserted, wherein the rotating disk of the rotation driving tool comprises a first rotating disk having a projection, wherein the second retaining member of the coating stripping tool has a feather-shaped part, wherein the coating stripping tool in the released state is attached to the second rotating disk and the first rotating disk rotates in a predetermined direction to bring the feather-shaped part into contact with the projection, thereby switching the coating stripping tool into the retained state, and wherein when the coating stripping tool is in the retained state, the first rotating disk rotates in a direction opposite to the predetermined direction to bring the feather-shaped part into contact with the projection, thereby switching the coating stripping tool into the released state.

According to such a configuration, the first retaining member of the coating stripping tool in a released state is attached to the second rotating disk, and rotation of the remote control rod allows the first rotating disk to rotate in a predetermined direction. Further, the projection of the first rotating disk comes into contact with the feather-shaped part of the second retaining member to rotate the second retaining member in a predetermined direction, thereby switching the coating stripping tool into the retained state. This allows the electric wire to be held by the retaining members and to be housed in the electric wire housing space of the rotating disk along with its rotatable shaft. When the first rotating disk is rotated in a predetermined direction with the electric wire being housed and held in the electric wire housing space, the coating stripping tool in the retained state rotates around the central axis of the electric wire, thereby stripping the insulation coating of the electric wire with the stripping blade. Then, when the coating stripping tool is in the retained state, rotation of the remote control rod allows the first rotating disk to rotate in a direction opposite to the predetermined direction. Further, the projection of the first rotating disk comes into contact with the feather-shaped part of the second retaining member to rotate the second retaining member in a direction opposite to the predetermined direction, thereby switching the coating stripping tool into the released state. This releases the electric wire from the retaining members.

Therefore, with this configuration, bringing the coating stripping device connected to the remote control rod closer to the strung electric wire on the ground or the working vehicle, and then only an operation to rotate the rotating disk by the remote rotating operation of the remote control rod enables easy stripping of the insulation coating of the electric wire with the stripping blade while retaining the electric wire, and release of the electric wire after the work is completed.

Workability can be improved, because operations required by a conventional coating stripping device are not necessary, such as stringing a tip hook of a switching operation rod from an operation ring, rotating an advancing/retracting shaft by rotating the rod, and advancing the retaining member to an electric wire retaining part. Moreover, in the present invention, a recess is formed on the first rod, and a finger grip which can be inserted in the recess may be formed on the first retaining member.

Further, the coating stripping method according to the present invention is a method of stripping an insulation coating of an electric wire using the coating stripping device described above, wherein the method comprises; attaching the coating stripping tool in the released state to the second rotating disk and the rotation driving tool to the remote control rod; housing an electric wire strung in the air in the electric wire housing space; switching the feather-shaped part into the retained state by rotating the first rotating disk in a predetermined direction using the remote control rod to bring the feather-shaped part into contact with the projection; stripping the insulation coating with a stripping blade by rotating the first rotating disk in a predetermined direction using the remote control rod to rotate the coating stripping tool around a central axis of an electric wire; switching the feather-shaped part into the released state by rotating the first rotating disk in a direction opposite to the predetermined direction using the remote control rod to bring the feather-shaped part into contact with the projection; and, separating the electric wire strung in the air from the electric-wire housing space.

Effect of the Invention

According to the above-mentioned coating stripping device and the coating stripping method using the same, bringing the coating stripping device connected to the remote control rod closer to the strung electric wire on the ground or the working vehicle, and then only an operation to rotate the rotating disk by the remote rotating operation of the remote control rod enables easy stripping of the insulation coating of the electric wire with the stripping blade while retaining the electric wire, and release of the electric wire after the work is completed.

DESCRIPTION OF THE INVENTIONS

Hereinafter, the best embodiments of the coating stripping device according to the present invention are described in detail based on the drawings. It should be understood that the embodiments disclosed below are illustrative but not restrictive in all respects. It should be understood that the technical scope of the present invention will be indicated by the description of claims, not the contents disclosed in the embodiments, and also all modifications are within meaning and scope equivalent to the scope of claims.

Figure 1:
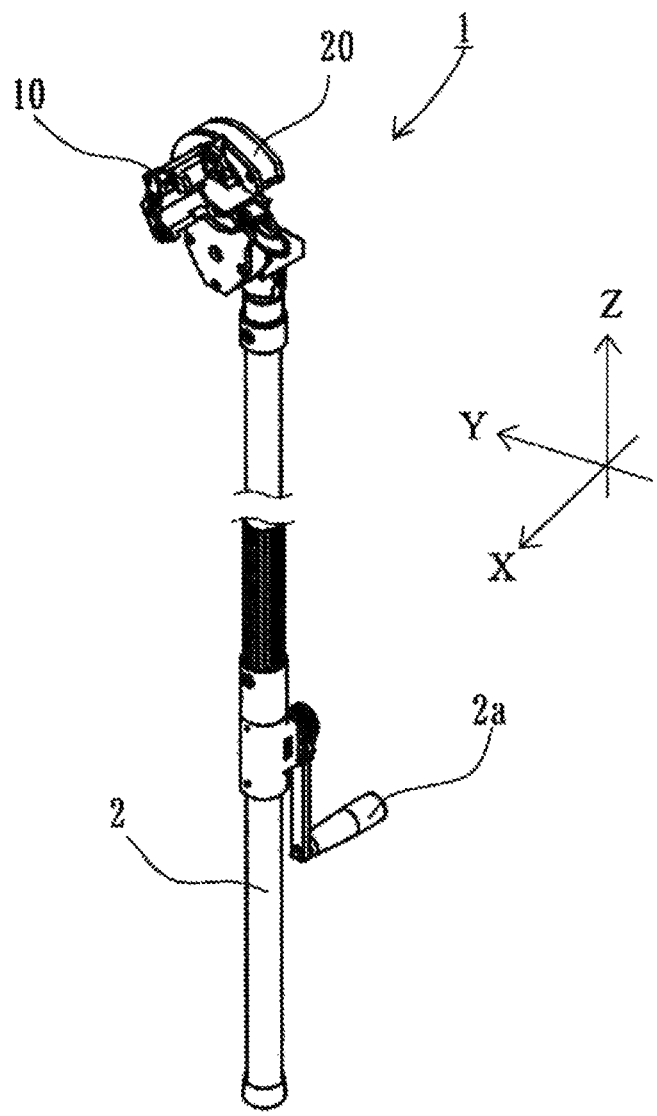
FIG. 1 is a perspective view explaining an outline of the coating stripping device according to embodiments of the present invention.
Figure 2:
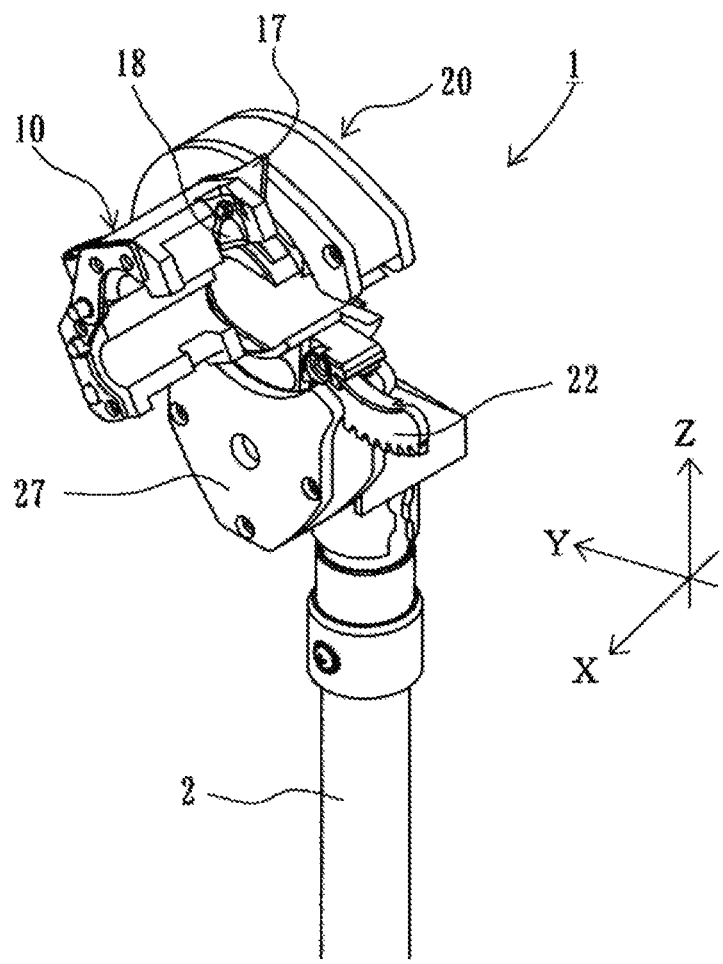
FIG. 2 is an enlarged perspective view explaining an outline of the coating stripping device shown in FIG. 1.
Figure 3:
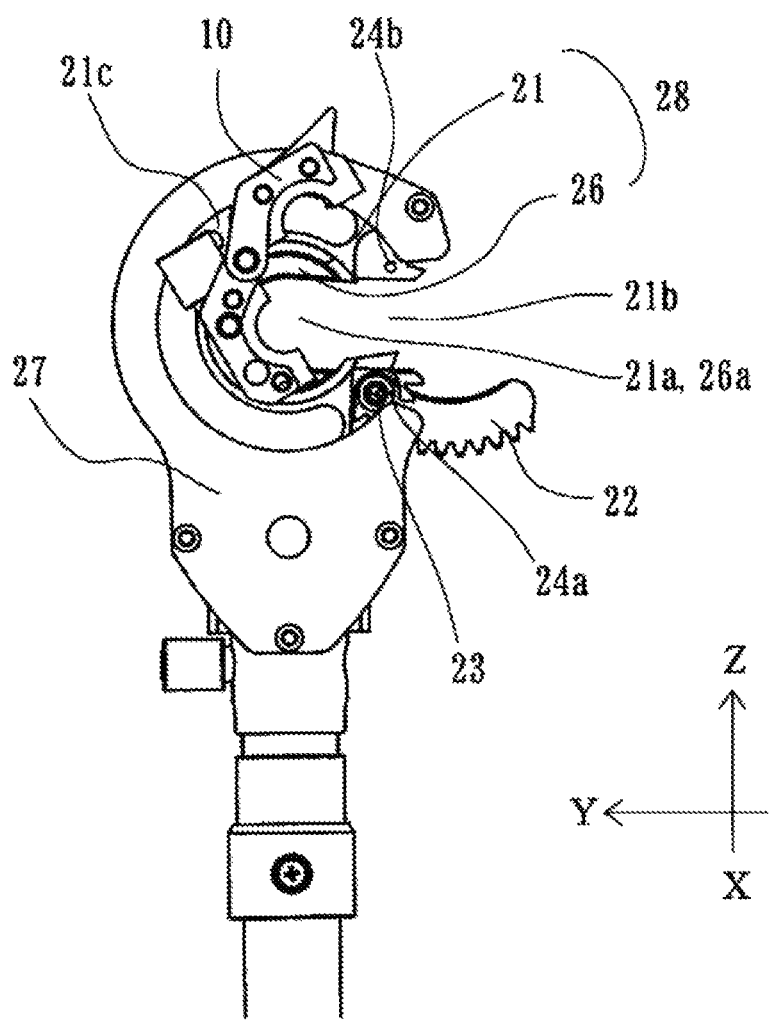
FIG. 3 is a side view explaining a structure of the coating stripping device shown in FIG. 2.
Figure 4:
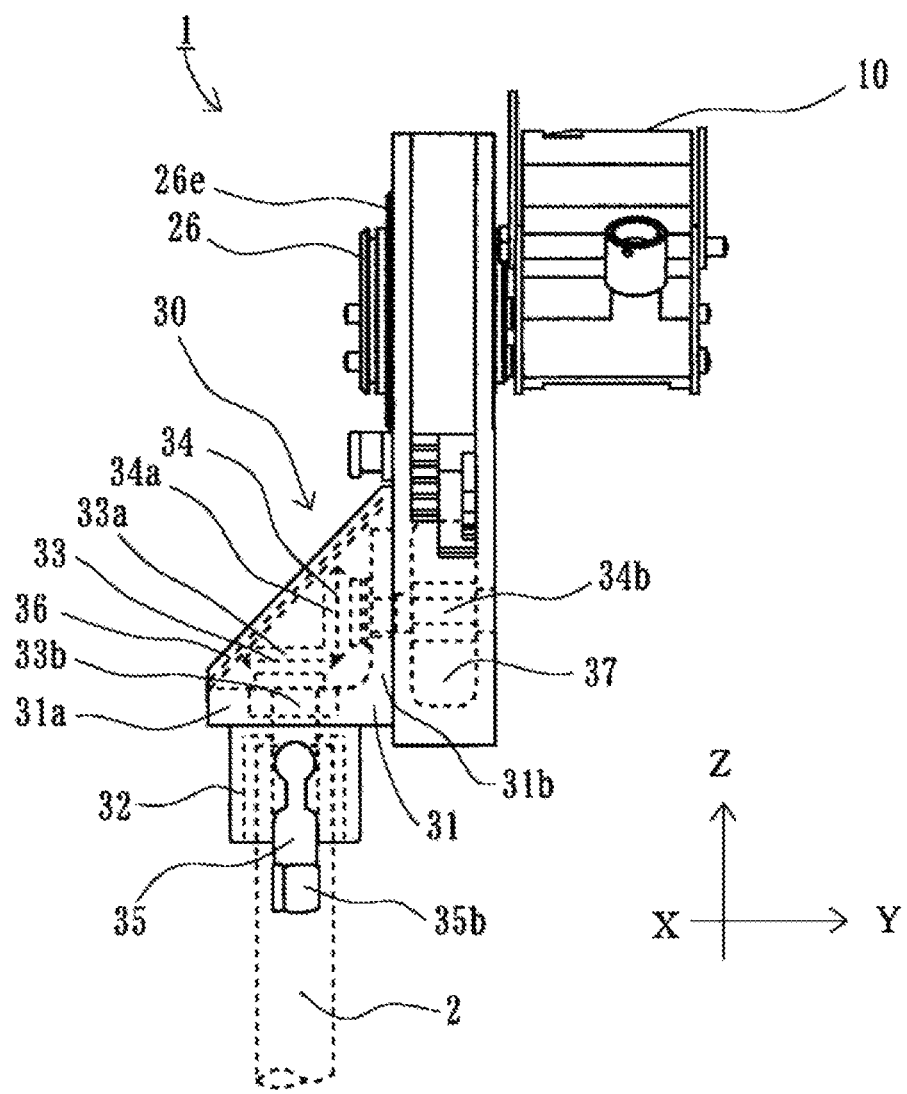
FIG. 4 is a front view explaining the structure of the coating stripping device shown in FIG. 2.

First, a structure of the coating stripping device according to the embodiments of the invention is explained based on the drawings. FIG. 1 is a perspective view explaining the outline of the coating stripping device according to the embodiments of the present invention. FIG. 2 is an enlarged perspective view explaining the outline of the coating stripping device shown in FIG. 1. FIG. 3 is a side view explaining the structure of the coating stripping device shown in FIG. 2, and FIG. 4 is a front view explaining the structure of the coating stripping device shown in FIG. 2. In addition, a port for removably inserting electric wire of FIGS. 1-4 is in an open state. A vertical direction is Z direction; a direction vertical to the Z direction is X direction; and a direction vertical to the Z direction and the X direction is Y direction.

A coating stripping device (1) of the present invention is configured by attaching a coating stripping tool (10) to a rotation driving tool (20), the coating stripping tool (10) is rotated around a central axis of an electric wire A by an operation of a remote control rod (2) coupled to the rotation driving tool (20), and then an insulation coating at an intermediate or end part of the electric wire A which is strung in the air is spirally stripped off with a stripping blade (18) of the coating stripping tool (10).

<Coating Stripping Tool>

Figure 5A:
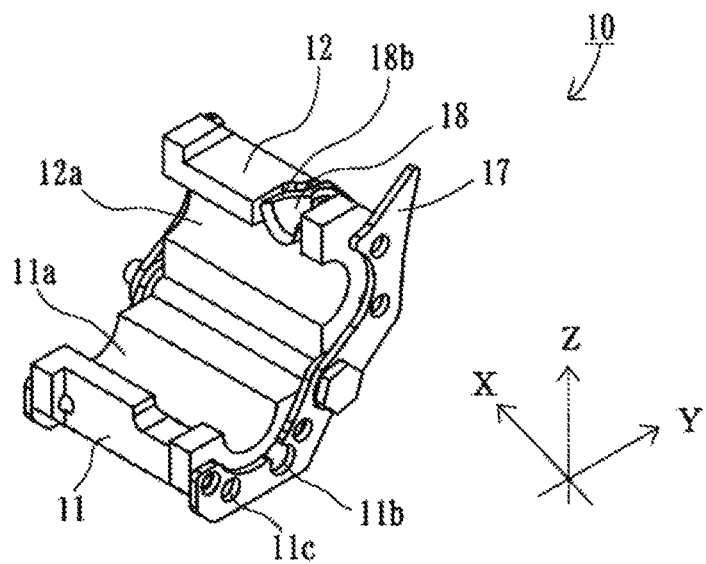
FIG. 5 is a view explaining a structure of a coating stripping tool.
Figure 5B:
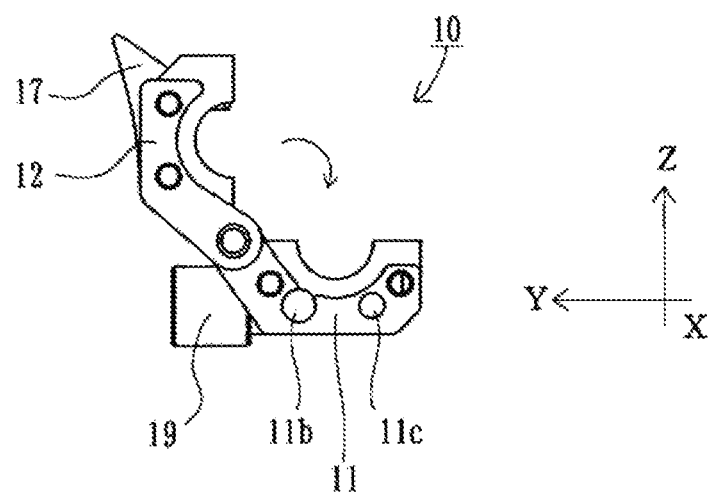

FIG. 5A-5C is a view explaining the structure of the coating stripping tool. FIG. 5A is a perspective view explaining the structure of the coating stripping tool, and FIG. 5B is a side view explaining the structure of the coating stripping tool shown in FIG. 5C. The coating stripping tool (10) comprises a first retaining member (11) having a finger grip (19) and a second retaining member (12) having a stripping blade (18) and a feather-shaped part (17).

A first cylindrical hole (11b) extending in the X direction and a second cylindrical hole (11c) extending in the X direction are formed in the first retaining member (11). Thereby, the first retaining member (11) is non-rotatably attached to the rotation driving tool (20) by an insertion of a first rod (26b) and a second rod (26c) of the rotation driving tool (20) mentioned later into the first hole (11b) and the second hole (11c) respectively. Moreover, the first retaining member (11) is to be detached from the rotation driving tool (20) by removing the first rod (26b) and the second rod (26c) from the first hole (11b) and the second hole (11c) respectively. That is, the first retaining member (11) is configured to be removably mounted to the rotation driving tool (20).

A finger grip (19) is coupled to the first hole (11b) and configured to move in the Y direction within the cylindrical hole extending in the Y direction.

Accordingly, when the first rod (26b) is inserted into a predetermined position of the first hole (11b), the first rod (26b) is gripped and moved in the Y direction by an operator, etc. to be inserted into a recess (26d) formed in the first rod (26b) mentioned later. That is, the first retaining member (11) is to be fixed in a predetermined position (cannot move in the X direction).

Moreover, a semi-cylindrical electric wire retaining recess (11a) having a central axis in the X direction is formed on an inner peripheral surface (upper surface) of the first retaining member (11).

The second retaining member (12) is coupled so that it can rotate (open and close) in the X direction as a rotating shaft relative to the first retaining member (11). Moreover, the triangular feather-shaped part (17) projecting in the Y direction (outside) is formed on the second retaining member (12).

Figure 7:
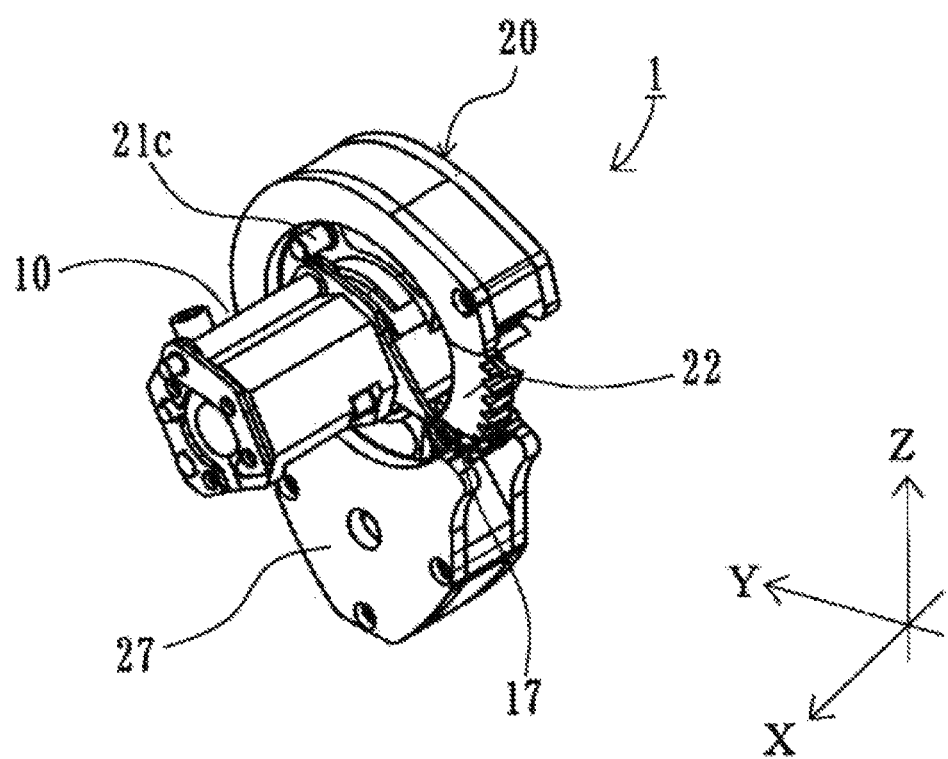
FIG. 7 is a perspective view explaining a structure of a rotation driving tool.
Figure 8:
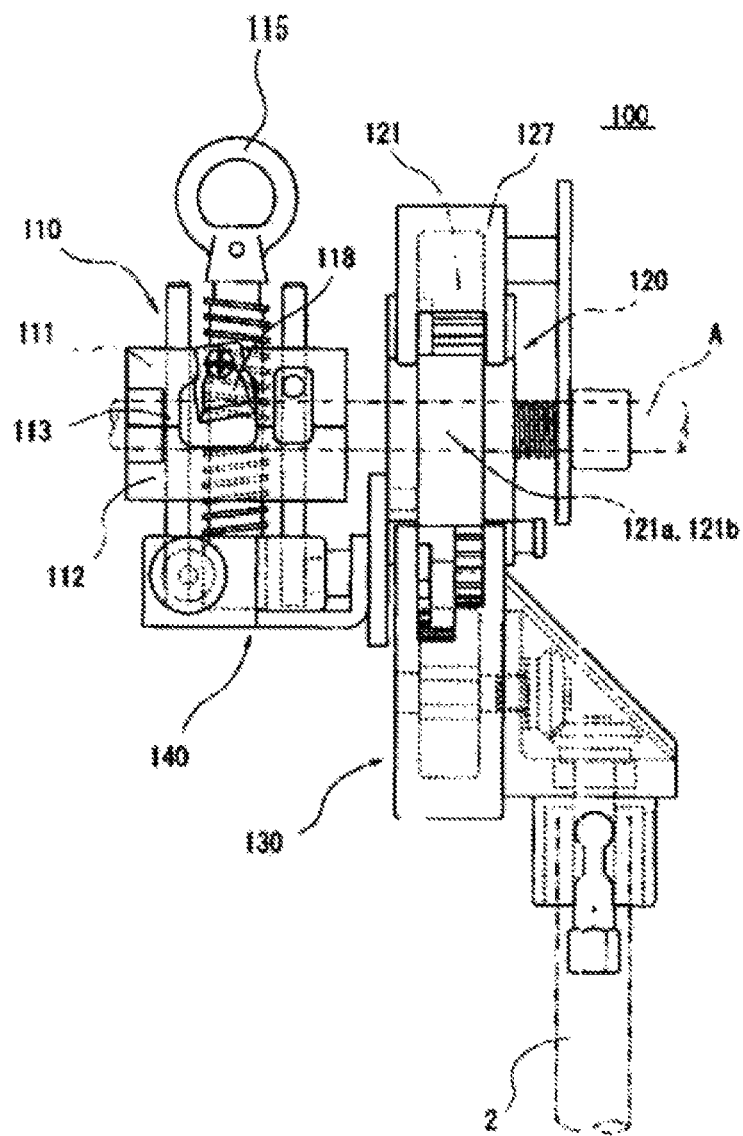
FIG. 8 is a front view explaining a structure of a conventional coating stripping device.

Thereby, the coating stripping tool is configured to be switched between a retained state (refer to FIG. 7) where the electric wire A is held by the first retaining member (11) and the second retaining member (12), and a released state (refer to FIG. 5) where the port for removably inserting electric wire is formed and the electric wire A is inserted/removed through the port for removably inserting electric wire. This switching between the retained state and the released state is performed by contacting the feather-shaped part (17) with a projection (21c) of the rotation driving tool (20) mentioned later.

In addition, in this embodiment, although the feather-shaped part (17) is described as a triangular plate, a shape of the feather-shaped part is not particularly limited and may be a quadrilateral plate or a shape containing circle.

Moreover, a semi-cylindrical electric wire retaining recess (12a) having a central axis in the X direction is formed on an inner peripheral surface (lower surface) of the second retaining member (12).

That is, the intermediate part of the electric wire A can be housed and retained in a cylindrical space formed by the electric wire retaining recesses (11a) and (12a) when the coating stripping tool is in the retained state.

A spiral projection for sending out electric wire (not shown) is formed on the inner peripheral surface of the electric wire retaining recesses (11a) and (12a) such that they continue between the electric wire retaining recesses (11a) and (12a). Thereby, when the coating stripping tool (10) rotates around the central axis of the electric wire A, the electric wire A housed and held is sent out in a predetermined direction.

In addition, the second retaining member (12) comprises an attaching aperture (18b) for arranging the stripping blade (18), wherein the stripping blade (18) is attached such that the edge of the blade projects by a predetermined dimension from the attaching aperture (18b) in the cylindrical space formed of the electric wire retaining recesses (11a) and (12a), at the predetermined angle and at an inclination angle (a predetermined advance angle) corresponding to a spiral inclination of the projection for sending out electric wire. Moreover, the insulation coating stripped by the stripping blade (18) is to be discharged outside through the attaching aperture (18b).

<Rotation Driving Tool>

Figure 6:
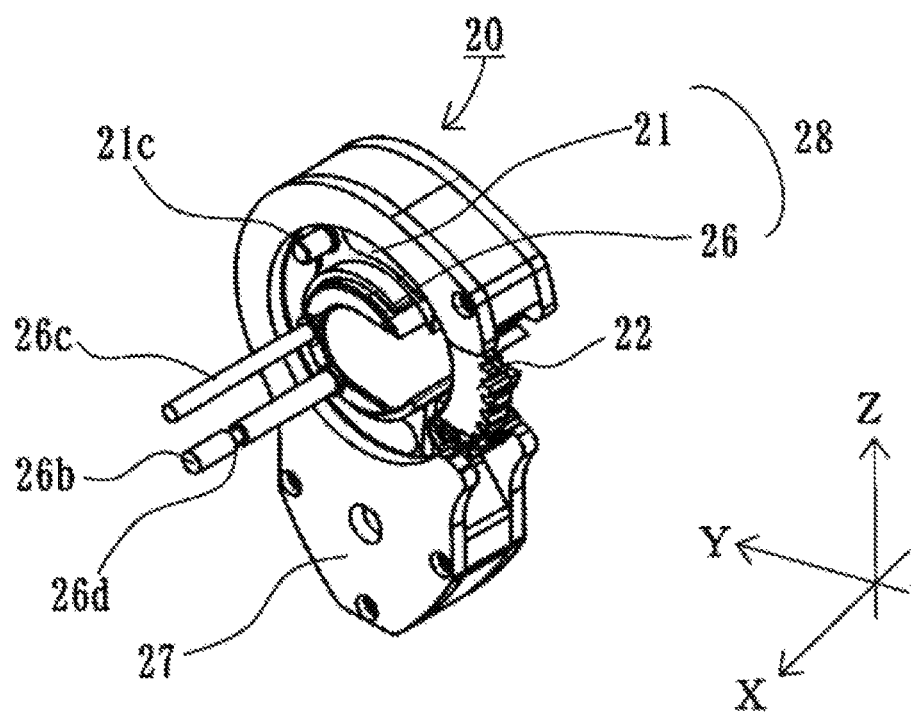
FIG. 6 is a perspective view explaining a structure of a rotation driving tool.

FIG. 6 is a perspective view illustrating a structure of a rotation driving tool. A rotation driving tool (20) is configured with a rotating disc (28) comprising a first rotating disc (21) and a second rotating disc (26), a case (27) rotatably supporting the rotating disc (28), and a rotation transmitting part (30) transmitting rotation of a shaft of a remote control bar (2) to rotation of the rotating disc (28).

<First Rotating Disc of the Rotation Driving Tool>

As shown in FIG. 3, the first rotating disc (21) is provided with a teeth meshing with a pinion (37) (see below) on an outer peripheral surface, and in a side view, it is a C-shaped flat plate formed with an opening at one side as an electric wire housing space (21a) which has a circular cross section and houses an electric wire A. The diameter and the width of the opening of the electric wire housing space (21a) is set to be wider than the diameter of the electric wire A, wherein the electric wire housing space (21a) is a space for housing the electric wire A, and the opening operates as a port for removable insertion (21b) for inserting the electric wire A into the electric wire housing space (21a) and removing it from the electric wire housing space (21a). The case (27) rotatably supporting the first rotating disc (21) is also provided with an opening in the same shape as the port for removably inserting electric wire (21b), wherein insertion and removal of the electric wire A through the port for removably inserting electric wire (21b) is allowed when the port for removably inserting electric wire (21b) is positioned at the opening of the case (27).

The first rotating disc (21) is provided with an oscillating shaft (23), wherein an opening/closing gear piece (22) is oscillatably attached around the oscillating shaft (23). The opening/closing gear piece (22) has an outer peripheral surface formed in a circular arc whose diameter is same as the outer diameter of the first rotating disc (21), and the outer peripheral surface is provided with a teeth in the same shape as the one of the first rotating disc (21). For an attaching portion of the opening/closing gear piece (22) in the first rotating disc (21), a part of the first rotating disc (21) is notched so as to enable attachment and oscillation of the opening/closing gear piece (22). For a part of the first rotating disc (21) receiving and engaging with a tip of the opening/closing gear piece (22), the part of the first rotating disc (21) is notched to receive the opening/closing gear piece (22). In this way, when the opening/closing gear piece (22) engages with the first rotating disc (21) (the port for removably inserting electric wire (21b) is closed), the first rotating disc (21) and the opening/closing gear piece (22) are configured as an integrated gear to be rotatably driven.

Ball plunger mechanisms (24a), (24b) are provided as a support mechanism at the side of the oscillation shaft (23) and the side of the first rotating disc (21) (the notched part) adjacent to the port for removably inserting electric wire (21b) opposite to the oscillation shaft (23). When pulling the opening/closing gear piece (22) out of the opening of the case (27) and setting the port for removably inserting electric wire (21b) in an open state, the ball plunger mechanism (24a) operates to maintain the open state. Due to the port for removably inserting electric wire (21b) in an open state, and the port for removably inserting electric wire (21b) corresponding to the opening of the case (27), the electric wire A can be inserted into the electric wire housing space (21a) and housed and held in the housing. Further, when the opening/closing gear piece (22) is pressed toward the port for removably inserting electric wire (21b), the ball plunger mechanism (24a) is released and the opening/closing gear piece (22) engages with the notched part of the first rotating disc (21) to operate the ball plunger mechanism (24b), thereby keeping the port for removably inserting electric wire (21b) in a closed state.

After finishing a strip of an insulation coating by the coating stripping tool (10), the remote control bar (2) rotates the first rotating disc (21) in a direction opposite to a predetermined direction (in FIG. 3, counterclockwise) to place it in a predetermined position (initial position). Then, the ball plunger mechanism (24b) is released, the opening/closing gear piece (22) is oscillated and released from the first rotating disc (21), and the port for removably inserting electric wire (21b) is opened, thereby releasing the electric wire A from the electric wire housing space (21a).

Further, the first rotating disc (21) is provided with a projection (21c) in a cylindrical shape having a central shaft in X direction. Hence, when the first rotating disc (21) rotates in a predetermined direction (in FIG. 3, clockwise), the projection (21c) together with the first rotating disc (21) will rotate in the predetermined direction (in FIG. 3, clockwise). On the other hand, when the first rotating disc (21) rotates in a direction opposite to the predetermined direction (in FIG. 3, counterclockwise), the projection (21c) will also rotate in a direction opposite to the predetermined direction (in FIG. 3, counterclockwise). If the coating stripping tool (10) is attached, the projection (21c) rotates in the predetermined direction (in FIG. 3, clockwise) and contacts with one side of the triangular feather-shaped part (17), thereby rotating the second retaining member (12) in the predetermined direction (in FIG. 3, clockwise). On the other hand, when the projection (21c) rotates in a direction opposite to the predetermined direction (in FIG. 3, counterclockwise) and contacts with one side of the triangular feather-shaped part (17), the second retaining member (12) will rotate in a direction opposite to the predetermined direction (in FIG. 3, counterclockwise).

While the projection (21c) is illustrated as a cylindrical shape in this embodiment, the shape is not particularly limited to a cylindrical one, and may be a square or elliptical one.

<Second Rotating Disc of the Rotation Driving Tool>

At the center, the second rotating disc (26) is C-shaped in a side view, a little smaller than the one of the first rotating disc (21), with an opening at one side as an electric wire housing space (26a (21a)) which has a circular cross section and houses an electric wire A, and in a front view, is positioned on an inner peripheral surface and both sides of the first rotating disc (21).

As shown in FIG. 4, a circular flange part (26e) is set near the outer side of the peripheral surface of the second rotating disc (26) (other side of the face attaching to the first rotating disc (21)), configured to form a circular recess between the side of the first rotating disc (21) and the flange part (26e) of the second rotating disc (26). The edge of the case (27) fits in the circular recess so as to rotatably fit the first rotating disc (21) and the second rotating disc (26) in the case (27).

Further, the second rotating disc (26) is provided with a first rod (26b) in a cylindrical shape having a central shaft in X direction and a second rod (26c) in a cylindrical shape having a central shaft in X direction. And a recess (26d) is formed on the outer peripheral surface of the first rod (26b). Hence, when the second rotating disc (26) rotates in a predetermined direction (in FIG. 3, clockwise), the first rod (26b) and the second rod (26c) rotate together with the second rotating disc (26) in the predetermined direction (in FIG. 3, clockwise). When the second rotating disc (26) rotates in a direction opposite to the predetermined direction (in FIG. 3, counterclockwise), the first rod (26b) and the second rod (26c) also rotates in a direction opposite to the predetermined direction (in FIG. 3, counterclockwise).

<Case of the Rotation Driving Tool>

The case (27) covers the first rotating disc (21) and the pinion (37), is further notched corresponding to the port for removably inserting electric wire (21b) of the first rotating disc (21) and the second rotating disc (26), and rotatably supports the first rotating disc (21) and the second rotating disc (26) in the opening.

<Rotation Transmitting Part of the Rotation Driving Tool>

The rotation transmitting part (30) is configured with a support base (31) in a form of a L-shaped side view, a support cylinder (32) attached to a lower part of a base part (31a) of the support base (31), a first bevel gear (33) and a second bevel gear (34) orthogonal to and meshing with each other, a coupled rotatable shaft (35) coupled to a shaft center of the first bevel gear (33), and a right triangle cover (36) in a side view covering these components, as well as a pinion (37) in the case (27) provided on the same shaft with the second bevel gear (34).

The support cylinder (32) receives the tip of the remote control bar (2) in the cylinder to support the coating stripping device tool (1) with the remote control bar (2).

The first bevel gear (33) is rotatably axially-supported into a hole in the center of the bottom part (31a) of the support base (31), and the gear part (33a) is arranged above the bottom part (31a) of the support base (31). Also, the second bevel gear (34) is rotatably axially-supported into a hole in the center of the side part (31b) of the support base (31). While the gear part (34a) is arranged on the side of the side part (31b) of the support base (31) and engaged with the gear part (33a) of the first bevel gear (33), the axial center part (34b) opposite to the gear part (34a) is protruded from the side part (31b) of the support base (31) and inserted in the case (27), and the pinion (37) is attached to the axial center part (34b) thereof. The coupled rotatable shaft (35) is arranged on the central axis of the support cylinder (32), and has an upper end joined to the axial center part (33b) of the first bevel gear (33), and a lower end provided with the head (35b) having a hexagonal shape in cross section to engage with the rotating shaft of the remote control rod (2).

<Remote Control Rod>

As a remote control rod (2), a well-known remote control rod comprising a rotating shaft inside a rod-like cylinder having a predetermined length are utilized, wherein the rotation of a handle (2a) is transmitted to the rotating shaft through a bevel gear by rotating the handle (2a). Insertion of a tip of the remote control rod (2) into the support cylinder (32) can connect the tip of the rotating shaft of the remote control rod (2) to the coupled rotatable shaft (35) (head (35b)), and thus support the coating stripping device (1) at the tip of the remote control rod (2). In this state, rotation of the handle (2a) of the remote control rod (2) in hand can rotate the coupled rotatable shaft (35), rotate the first bevel gear (33) joined to the coupled rotatable shaft (35) and the second bevel gear (34) engaged with the first bevel gear (33), rotate the pinion (37) coaxially attached to the second bevel gear (34), and rotate the coating stripping tool (10) attached through the rotating disk (28) engaged with the pinion (37).

At this time, rotation of the handle (2a) of the remote control rod (2) in a predetermined direction can rotate the coupled rotatable shaft (35) in the predetermined direction, rotate the first bevel gear (33) joined to the coupled rotatable shaft (35) and the second bevel gear (34) engaged with the first bevel gear (33) in the predetermined direction, rotate the pinion (37) coaxially attached to the second bevel gear (34) in the predetermined direction, and rotate the coating stripping tool (10) attached through the rotating disk (28) engaged with the pinion (37) in the predetermined direction. On the contrary, rotation of the handle of the remote control rod (2) in a direction opposite to the predetermined direction can rotate the coupled rotatable shaft (35) in the opposite direction, rotate the first bevel gear (33) joined to the coupled rotatable shaft (35) and the second bevel gear (34) engaged with the first bevel gear (33) in the opposite direction, rotate the pinion (37) coaxially attached to the second bevel gear (34) in the opposite direction, and rotate the first rotating disk (21) engaged with the pinion (37) in the opposite direction.

<Method of Stripping Coating of Electric Wire>

Subsequently, a method of stripping a coating of electric wire A using the coating stripping device (1) of the present invention is simply explained herein, due to its overlap with the above description.

The method of stripping a coating comprises attaching step (A), housing step (B), retaining step (C), stripping step (D), releasing step (E) and separating step (F).

(A) Attaching Step

Firstly, the coating stripping tool (10) is switched to a released state. Then, the first rod (26b) of the rotation driving tool (20) is inserted into the first hole (11b) and a second rod (26c) is inserted into the second hole (11c) to attach the coating stripping tool (10) to the rotation driving tool (20). Then, when the first rod (26b) is inserted at the predetermined position in the first hole (11b), a finger grip (19) is inserted into the recess (26d) formed in the first rod (26b). Secondly, the tip of the remote control rod (2) is inserted into the support cylinder (32) of the rotation driving tool (20) to support the coating stripping device (1), and a tip of rotation operating means of the remote control rod (2) is connected with the coupled rotatable shaft (35).

(B) Housing Step

A port for removably inserting electric wire (21b) of the first rotating disk (21) of the rotation driving tool (20) is switched to a released state (maintaining the open state with a ball plunger mechanism (24), the coating stripping device (1) is moved closer to the electric wire A strung in the air, and an intermediate part of the electric wire A is housed in an electric wire-housing space (21a).

(C) Retaining Step

The coupled rotatable shaft (35) is rotated in a predetermined direction by remote control from the rotation operating means of the remote control rod (2) and this rotational force is transmitted through a rotation transmitting part (30) to the first rotating disk (21) to rotate the first rotating disk (21) in a predetermined direction. Then, when a projection (21c) rotates in the predetermined direction and contacts with a feather-shaped part (17), a second retaining member (12) rotates in the predetermined direction. Consequently, the coating stripping tool (10) is switched to the retained state, the electric wire A is held between the first retaining member (11) and the second retaining member (12), and a stripping blade (18) bites into an insulation coating B (see FIG. 7). When an opening of the case (27) corresponds to an opening of the second rotating disk (26), the contact area of the case (27) and the second rotating disk (26) becomes larger, thereby frictional resistance becomes larger, and the second rotating disk (26) hardly rotates to the case (27).

(D) Stripping Step

The coupled rotatable shaft (35) is rotated in a predetermined direction by remote control from the rotation operating means of the remote control rod (2) and this rotational force is transmitted through a rotation transmitting part (30) to the first rotating disk (21) to rotate the first rotating disk (21) in a predetermined direction. Then, when a projection (21c) rotates in the predetermined direction and contacts with a feather-shaped part (17), the held coating stripping tool (10) rotates together with the second rotating disk (26) in the predetermined direction around the central axis of the electric wire A. Consequently, the stripping blade (18) will strip an insulation coating B by the blade width thereof.

(E) Releasing Step

The second rotating disk (26) is arranged at the predetermined position (initial position) with respect to the case (27). That is, the port for removably inserting electric wire (21b) corresponds to the opening of the case (27). Then, the coupled rotatable shaft (35) is rotated in a predetermined direction by remote control from the rotation operating means of the remote control rod (2) and this rotational force is transmitted through a rotation transmitting part (30) to the first rotating disk (21) to rotate the first rotating disk (21) in a direction opposite to the predetermined direction. Then, when a projection (21c) rotates in a direction opposite to the predetermined direction and contacts with a feather-shaped part (17), the second retaining member (12) rotates in the opposite direction. Consequently, the coating stripping tool (10) will be switched to the released state. Moreover, it is possible to open the port for removably inserting electric wire (21b), and separate the coating stripping device (1) from the electric wire A.

(F) Separating Step

The coating stripping device (1) is separated from the intermediate part of the electric wire A strung in the air.

According to the above-described coating stripping device (1) and the method of stripping the coating using the same, bringing the coating stripping device (1) connected to the remote control rod (2) closer to the strung electric wire A on the ground or the working vehicle, and then only an operation to rotate the rotating disk (28) by the remote rotating operation of the remote control rod (2) enables easy stripping of the insulation coating of the electric wire A with the peeling blade while retaining the electric wire A, and release of the electric wire A after the work is completed.

INDUSTRIAL AVAILABILITY

The present invention can provide a coating stripping device for stripping an insulation coating of an electric wire used for high voltage wiring, etc.

The invention claimed is:

1. A coating stripping device, comprising:
a rotation driving tool attached to a tip of a remote control rod, the rod configured to be gripped by a worker; and
a coating stripping tool attached to the rotation driving tool, wherein the remote control rod is configured to provide a rotational force to the coating stripping tool by a rotation operation of the remote control rod being transmitted via the rotation driving tool to the coating stripping tool, and the coating stripping device configured to rotate the coating stripping tool around a central axis of an electric wire to strip an insulation coating, of the electric wire,
wherein the coating stripping tool comprises:
a retaining member for retaining the electric wire; and
a stripping blade, configured to protrude into the insulation coating of the electric wire while the electric wire is retained by the retaining member,
wherein the rotation driving tool comprises:
a case, the case having a first, port for removably inserting a removed portion of the electric wire which removed portion of the electric wire is formed by the outer periphery of said electric wire which has been cut partially away from the electric wire and a first electric wire housing space for removably housing the electric wire through the first port for removably inserting electric wire through said housing;
a rotating disk rotatably retained by the case, the rotating disk having a second port for removably inserting a removed portion of the electric wire which removed portion of the electric wire is formed by the outer periphery of said electric wire which has been cut partially away from the electric wire and a second electric wire housing space for removably housing the removed portion of the electric wire through the second port for removably inserting removed portion of the electric wire; and a rotation transmitting means retained by the case and configured to transmit a rotation of a rotating shaft of the remote control rod to a rotation of the rotating disk,
wherein the retaining member has a first retaining element and a second retaining element, wherein the second retaining element is rotatable relative to the first retaining element,
wherein the coating stripping tool is configured to be switched between a retaining state where the electric wire is held by the first retaining element and the second retaining element and a releasing state where the second port for removably inserting electric wire is opened and the electric wire is insertable and removable through the second port for removably inserting electric wire,
wherein the rotating disk of the rotation driving tool comprises a second rotating disk, the second rotating disk having a first rod and a second rod parallel to the first rod,
wherein the first retaining element of the coating stripping tool has a first hole in which the first rod is inserted, and a second hoe in which the second rod is inserted,
wherein the rotating disk of the rotation driving tool comprises a first rotating disk having a projection,
wherein the second retaining element of the coating stripping tool has a triangular plate,
wherein when the coating stripping tool is in the releasing state the coating stripping tool is attached to the second rotating disk and the first rotating disk is configured to be rotatable in a predetermined direction to bring the triangular plate into contact with the projection to thereby switch the coating stripping tool into the retaining state, and
wherein when the coating stripping tool is in the retaining state, the first rotating disk is configured to rotate in a direction opposite to the predetermined direction to bring the triangular plate into contact with the projection, to thereby switch the coating stripping tool into the releasing state.

2. The coating stripping device according to claim 1, wherein the first rod has a recess, and
wherein the first retaining member has a finger grip insertable into the recess.

3. A method of stripping an insulation coating of an electric wire using the coating stripping device according to claim 1, wherein the method comprises:
attaching the coating stripping tool in a releasing state to the second rotating disk and attaching the rotation driving tool to a remote control rod; housing the electric wire in the air in the electric wire housing space;
switching the triangular plate into a retained state by rotating the first rotating disk in a predetermined direction using the remote control rod to bring the triangular plate out of contact with a projection;
stripping the insulation coating with a stripping blade by rotating the first rotating disk in a predetermined direction using the remote control rod to rotate the coating stripping tool around a central axis of the electric wire;
switching the triangular plate into a released state by rotating the first rotating disk in a direction opposite to the predetermined direction using the remote control rod to triangular plate out of contact with the projection; and
separating the electric wire in an elevated position relative to the electric wire housing space from the electric wire housing space.

4. A method of stripping an insulation coating of an electric wire using the coating stripping device according to claim 2, wherein the method comprises:

attaching the coating stripping tool in a released state to a second rotating disk and attaching a rotation driving tool to a remote control rod;
housing the electric wire in an elevated position relative to the electric wire housing space in the electric wire housing space;
switching the triangular plate into the retained state by rotating a first rotating disk in a predetermined direction using the remote control rod to bring the triangular plate into contact with a projection;
stripping the insulation coating with a stripping blade by rotating the first rotating disk in a predetermined direction using the remote control rod to rotate the coating stripping tool around a central axis of the electric wire;
switching the triangular plate into the released state by rotating the first rotating disk in a direction opposite to the predetermined direction using the remote control rod to bring the triangular plate into contact with the projection; and
separating the electric wire in an elevated position relative to the electric wire housing space from the electric-wire housing space.

* * * * *